No. 848,217. PATENTED MAR. 26, 1907.
J. L. & M. H. WEBB.
BEET HARVESTING MACHINE.
APPLICATION FILED MAR. 13, 1906.
7 SHEETS—SHEET 1.
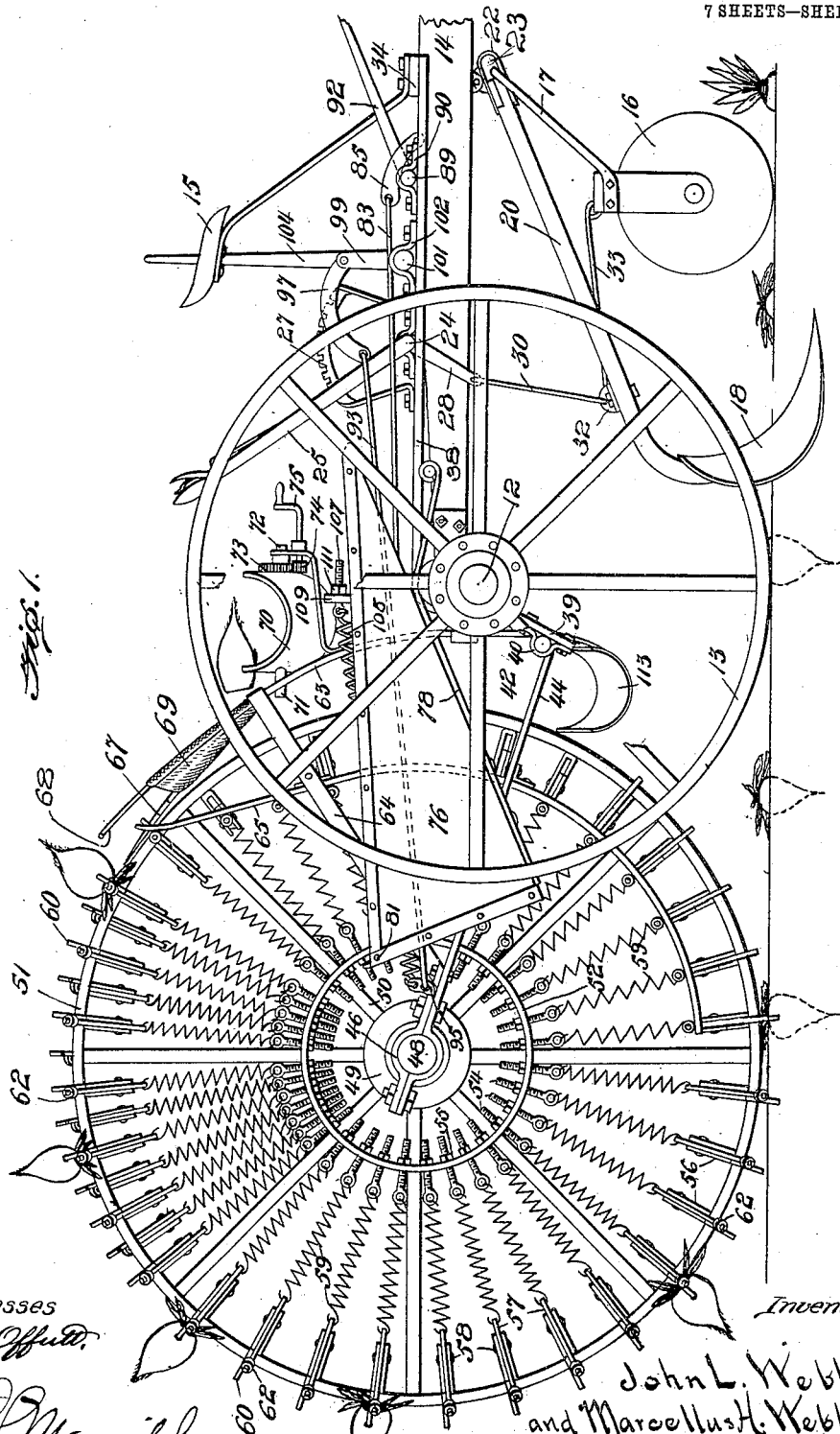

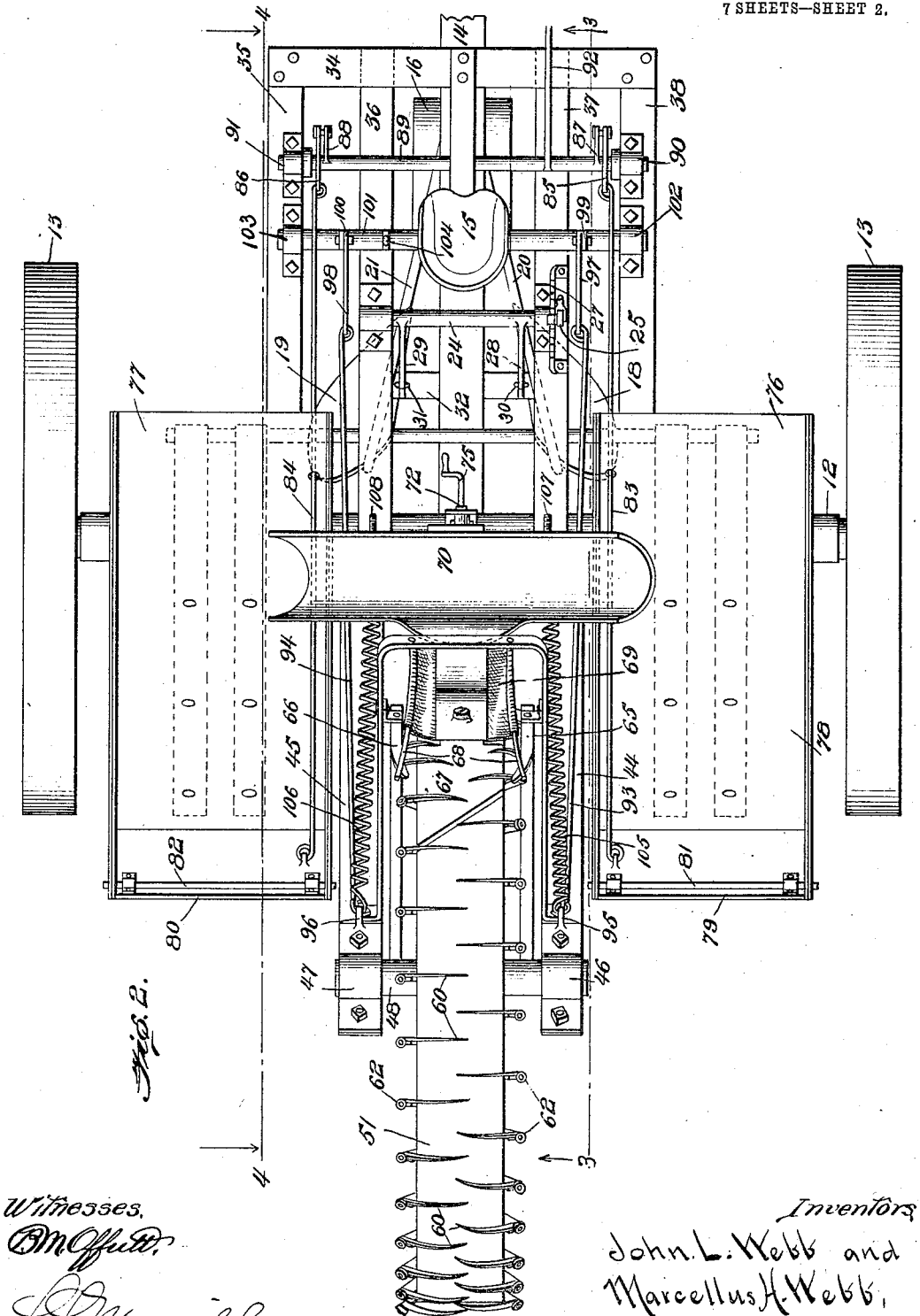

No. 848,217. PATENTED MAR. 26, 1907.
J. L. & M. H. WEBB.
BEET HARVESTING MACHINE.
APPLICATION FILED MAR. 13, 1906.
7 SHEETS—SHEET 3.
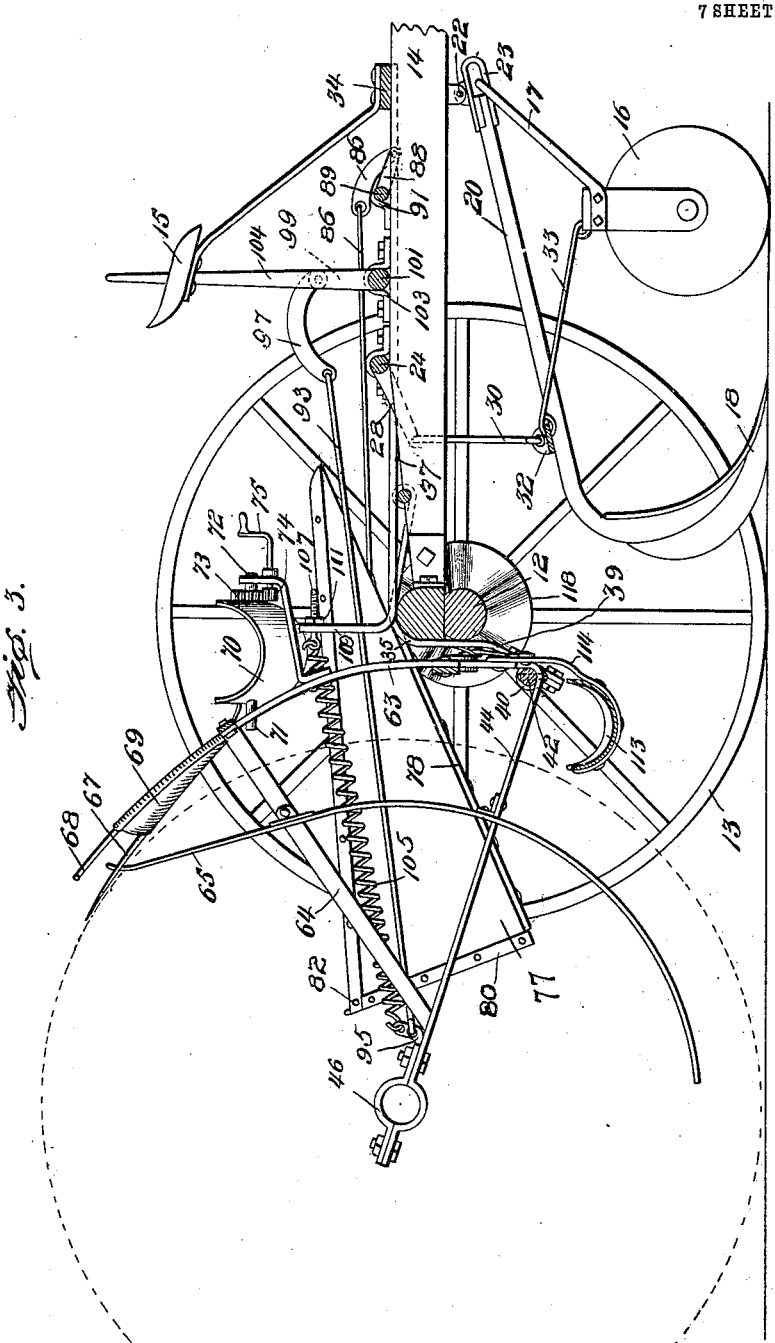
Witnesses
BM Offutt
LD Morrel
Inventors
John L. Webb and
Marcellus H. Webb,
By
Mason Fenwick & Lawrence Attys.

No. 848,217. PATENTED MAR. 26, 1907.
J. L. & M. H. WEBB.
BEET HARVESTING MACHINE.
APPLICATION FILED MAR. 13, 1906.
7 SHEETS—SHEET 4.
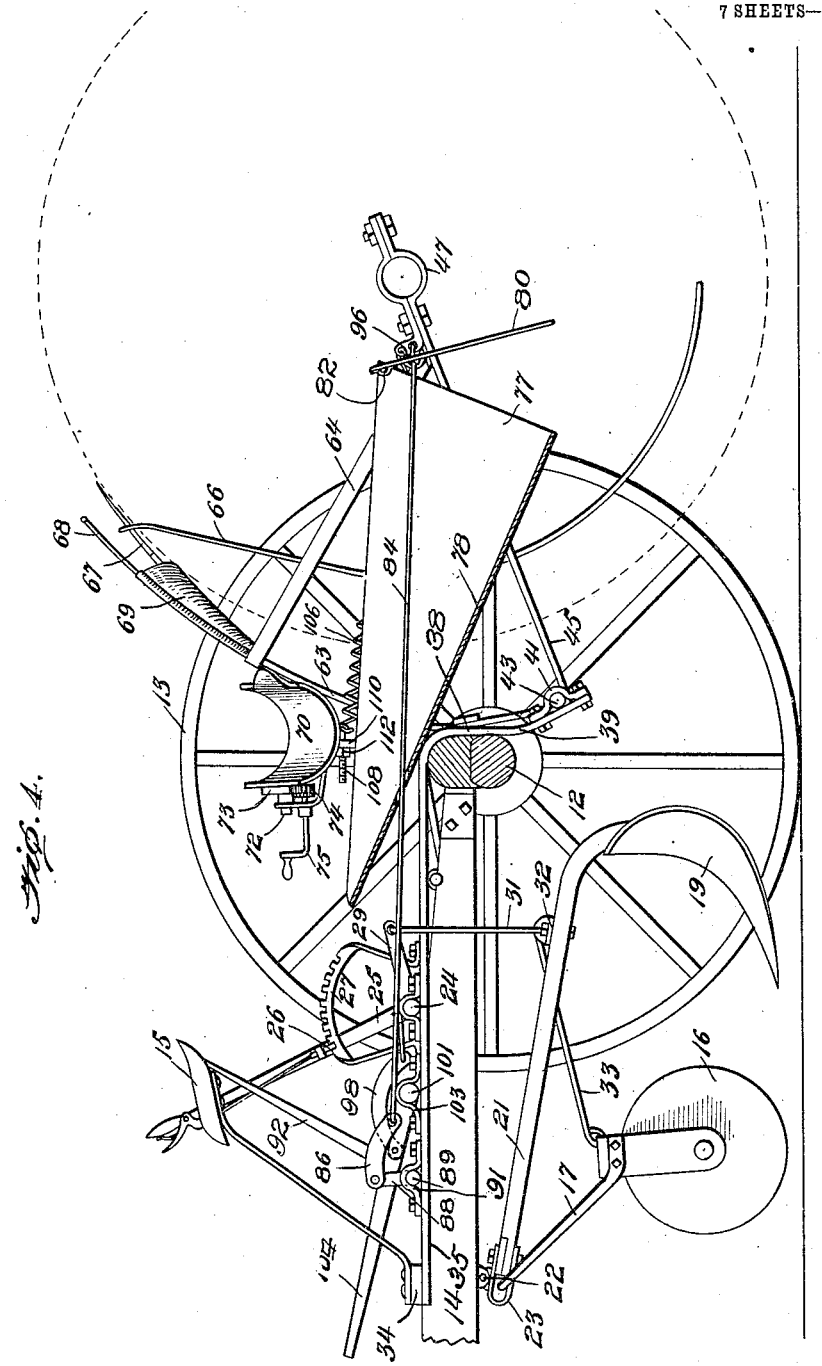
Witnesses
Inventors
John L. Webb and
Marcellus H. Webb,
By
Mason Fenwick & Lawrence Attys.

No. 848,217. PATENTED MAR. 26, 1907.
J. L. & M. H. WEBB.
BEET HARVESTING MACHINE.
APPLICATION FILED MAR. 13, 1906.
7 SHEETS—SHEET 5.
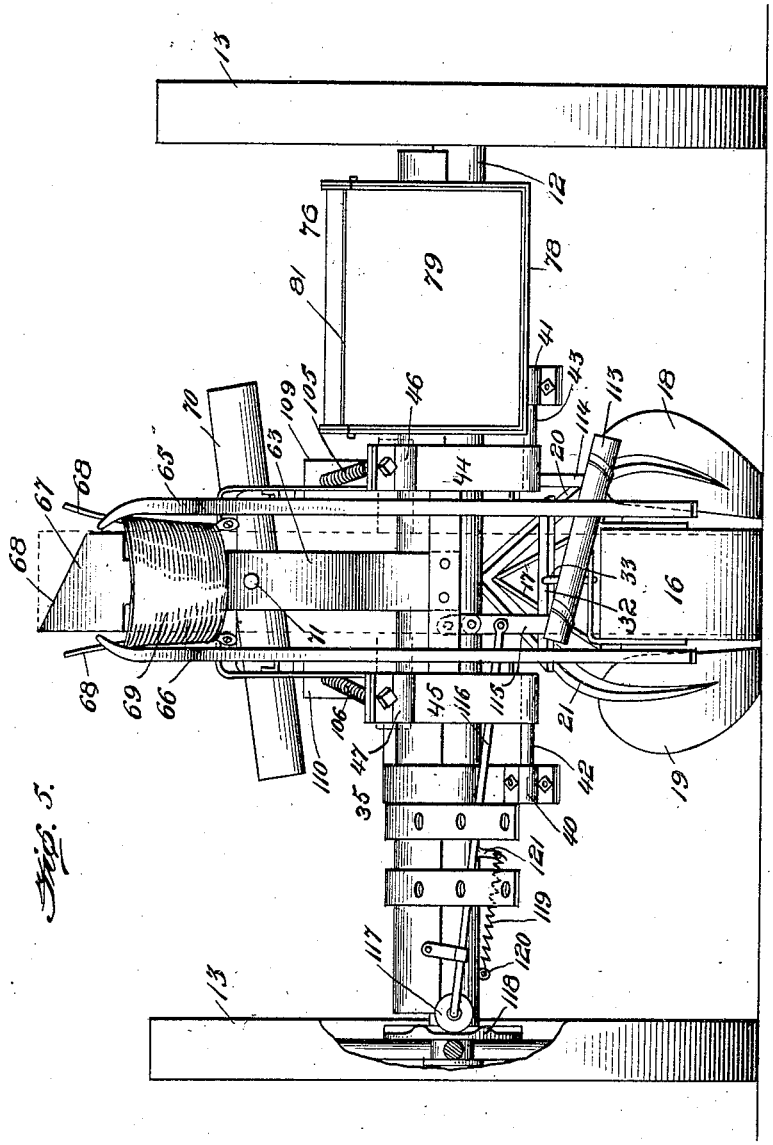
Witnesses
B. M. Offutt
L. L. Morrell
Inventors
John L. Webb and
Marcellus H. Webb,
By Mason Fenwick & Lawrence Attys.

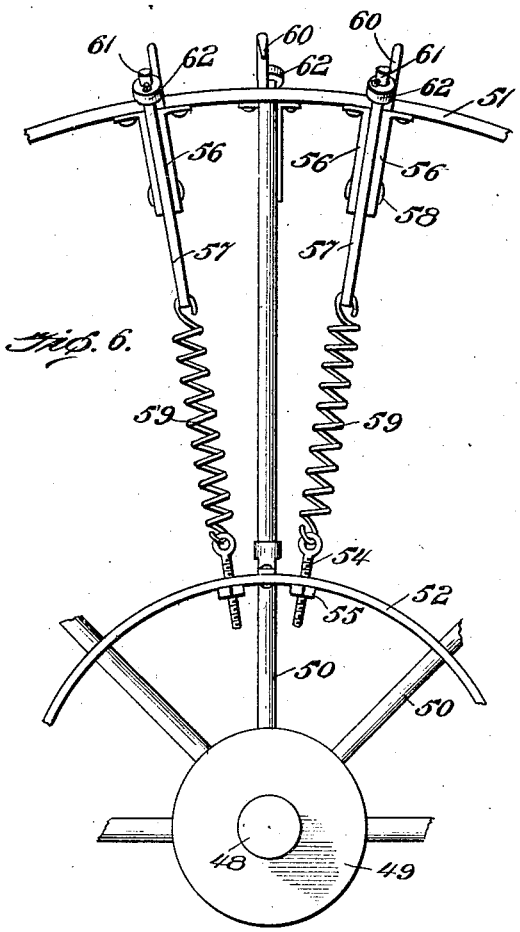
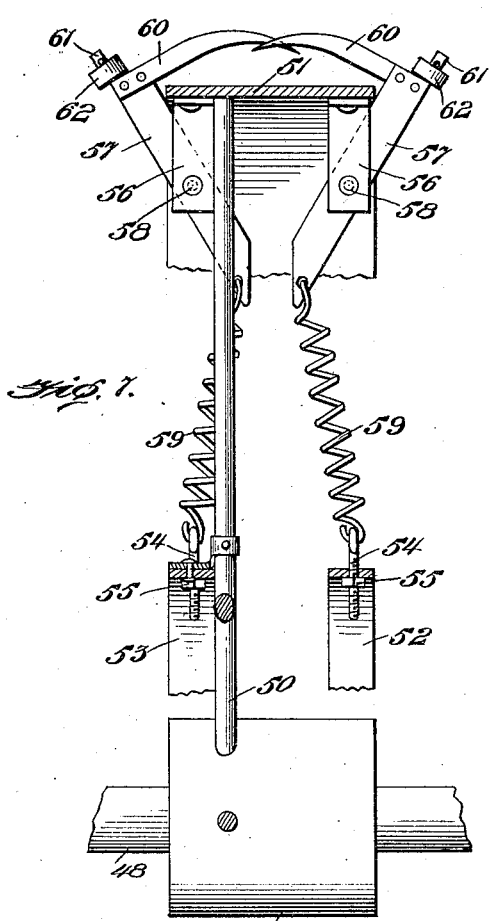
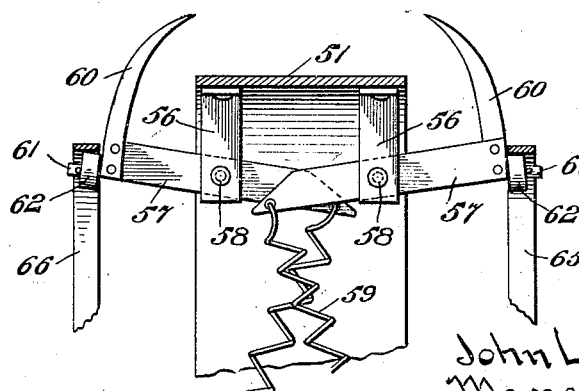

No. 848,217. PATENTED MAR. 26, 1907.
J. L. & M. H. WEBB.
BEET HARVESTING MACHINE.
APPLICATION FILED MAR. 13, 1906.
7 SHEETS—SHEET 7.
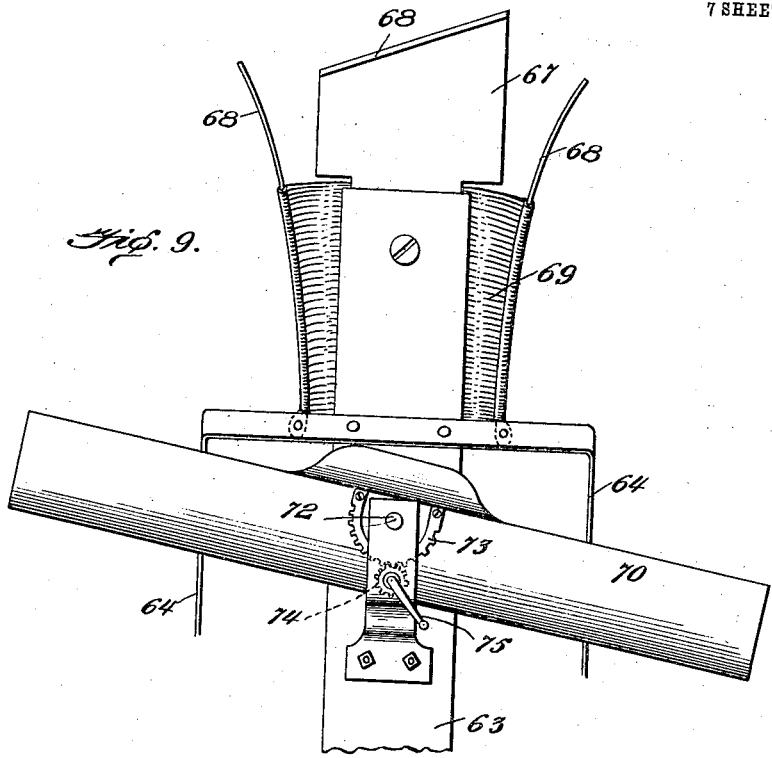
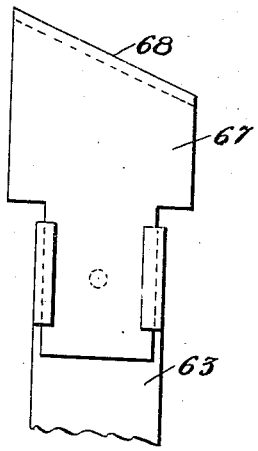
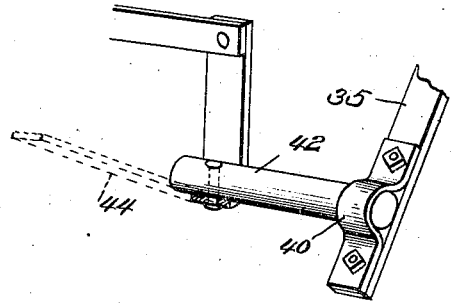
Witnesses
Inventors
John L. Webb and
Marcellus H. Webb,
By
Mason Fenwick & Lawrence Attys.

UNITED STATES PATENT OFFICE.

JOHN LYMAN WEBB AND MARCELLUS HORACE WEBB, OF THORNTON, IDAHO.

BEET-HARVESTING MACHINE.

No. 848,217.  Specification of Letters Patent.  Patented March 26, 1907.

Application filed March 13, 1906. Serial No. 305,854.

*To all whom it may concern:*

Be it known that we, JOHN LYMAN WEBB and MARCELLUS HORACE WEBB, citizens of the United States, residing at Thornton, in the county of Fremont and State of Idaho, have invented new and useful Improvements in Beet-Harvesting Machines, of which the following is a specification.

This invention relates to beet-harvesters, and has for an object to provide a harvester embodying new and improved features of reliability, accuracy, ease of draft, and general efficiency.

A further object of the invention is to provide a harvester embodying a wheel carrying about its periphery a plurality of gripping-fingers arranged to engage with and extract the beets from the soil and operated by springs throwing the gripping-fingers into such contact and holding them yieldingly in such relation.

A further object of the invention is to provide a beet-harvester embodying spaced plows arranged to throw dirt each way away from the row of standing beets, leaving the beets standing upon a narrow unsupported ridge, and with a broad-rimmed caster-wheel arranged to crush down the standing tops of the beets.

A further object of the invention is to provide a beet-harvester embodying a wheel provided with a plurality of beet-gripping fingers and with a clipping-knife disposed adjacent the periphery of the wheel and with root-receiving receptacles upon each side of the wheel, with the guide from the wheel arranged to discharge the roots into either receptacle.

With these and other objects in view the invention comprises certain novel constructions, combinations, and arrangements of parts, as will be hereinafter fully described and claimed.

In the accompanying drawings, Figure 1 is a view in side elevation of the improved beet-harvester. Fig. 2 is a top plan view of the harvester. Fig. 3 is a longitudinal sectional view of the harvester, taken on line 3 3 of Fig. 2. Fig. 4 is a longitudinal sectional view of the harvester, taken on line 4 4 of Fig. 2. Fig. 5 is a view of the harvester in rear elevation with the gripping and lifting wheel removed. Fig. 6 is a detail view, in side elevation, of a fragment of the rim of the gripping and lifting wheel, together with the fingers resiliently attached thereto. Fig. 7 is a detail view in section of the rim of the lifting-wheel and showing the gripping-fingers in closed position. Fig. 8 is a detail sectional view of the rim and gripping-fingers, showing the fingers opened. Fig. 9 is a detail view, in front elevation, of the top-clipping knife with the root guide and chute. Fig. 10 is a view in reverse elevation of the top-clipping knife. Fig. 11 is a detail perspective view of the bearing to which the lifting-wheel is pivoted.

Like characters of reference designate corresponding parts throughout the several views.

The beet-harvester forming the subject-matter of this application comprises a vehicle embodying the axle 12, upon which are mounted the usual carrying-wheels 13 and provided with a pole or tongue 14 or other approved means for attaching the draft, and further provided, if found desirable, with a seat, as 15, for accommodation of the driver. Beneath the pole is mounted a caster-wheel 16 forwardly of the carrying-wheel and secured in any approved manner, as by a link or bar 17, pivoted beneath the pole. Beneath the pole are also suspended plows 18 and 19, spaced apart and following behind the caster-wheel and so positioned as to throw a furrow upon each side of the track of the caster-wheel. The plows 18 and 19 are secured to the pole in any approved manner, as by their respective beams 20 and 21, pivoted, as at 22, and provided with a yoke 23, accommodating the forward end of the bar 17. For adjusting the vertical height of the plows 18 and 19 a shaft 24 is mounted upon the vehicle transversely thereof and provided with a lever 25, having a spring-actuated pawl 26, engaging a segmental rack 27 in the usual well-known manner. To the shaft 24 are also rigidly secured the arms 28 and 29 to occupy positions approximately above the beams 20 and 21 and in a plane substantially perpendicular to the lever 25. From the levers 28 and 29, respectively, links 30 and 31 extend downwardly and are pivotally connected with a bar 32, extending transversely across and rigidly secured to the beams 19 and 20. To the plate 32 is also pivoted a link 33, extending forwardly to and pivotally connected with the frame of the caster-wheel 16.

Transversely across the tongue, somewhat forwardly of the caster-wheel, is rigidly secured a frame-piece 34, to which are rigidly secured longitudinal frame-pieces 35, 36, 37, and 38, extending rearwardly therefrom and connected rigidly with the axle 12. The outer frame-pieces 35 and 38 are curved downwardly at the rear of the axle, as at 39, and are provided with alined bearings 40 and 41, in which are journaled trunnions 42 and 43, extending toward each other, but with their adjacent ends spaced apart, and having rigidly secured thereto the curved supporting-pieces 44 and 45, extending rearwardly and upwardly inclined and provided at their rearward extremities with bearings 46 and 47. Within the alined bearings 46 and 47 is journaled the axle-shaft 48, upon which is rigidly mounted the lifting-wheel, comprising a hub 49, with radial spokes, as 50, rigidly outstanding therefrom in the usual manner, and with a wide peripheral rim 51. About and concentric with the hub bands 52 and 53 are rigidly secured to the spokes 50 and with a plurality of threaded eyebolts 54 extending therethrough and with nuts 55 engaged thereupon and in contact with the inner surface of the said bands 52 and 53.

Spaced about the inner surface of the peripheral rim of the wheel are a plurality of ears 56, rigidly secured to the said rim and forming pivotal bearings for the levers 57, as at 58. The levers 57 are movable about their pivots 58 to assume a position substantially parallel with the rim 51, as shown in Fig. 8, or to assume an inclination thereto, as shown in Fig. 7, with their extremities projected rigidly beyond the lines of the said rim and held in such position by means of springs 59, secured at one end to the eyebolt 54 and pivotally secured at their opposite ends to the said levers 57. To the outer extremities of levers 57 are rigidly secured fingers 60, positioned and proportioned when the levers are in a closed position, as shown in Fig. 7, to extend over the peripheral rim of the wheel past the center line thereof, as plainly shown in said Fig. 7, and when the said levers are in the position approximately parallel with the plane of the rim to stand approximately perpendicular to the plane of the said rim. At the extreme outer ends the arms 57 are provided with trunnions 61 and upon which are journaled rollers 62.

Rigid and preferably integral with the frame-pieces 44 and 45 is carried a curved frame-piece 63, extending upwardly and curved rearwardly toward the periphery of the rim 51 and held in such position in any approved manner, as by the braces 64. To the frame-pieces 44 and 45 and the curved frame-pieces 63 are rigidly secured the curved cams or guides 65 and 66, positioned to engage the rollers 62 when the levers 57 are in the position shown in Fig. 7 and to move and retain the said rollers and their associated arms to and maintain them in the position shown in Fig. 8, with the gripping-fingers 60 separated. The cams 65 and 66 are spaced and disposed upon opposite sides of the rim 51 and terminate at their upper extremities somewhat forwardly of the vertical from the axle 48 and extend in an arc-line substantially concentric with the rim 51 to a point substantially beneath the said axle 48, so that the gripping-fingers are separated upon the upper side of the wheel and are retained in such separated state until they reach a point substantially beneath the axle, when the rollers 62 are released by the cam-track 65 and 66 and are permitted to yield to the tensions of the springs 59 to assume the position shown in Fig. 7.

To the upper extremity of the curved frame-piece 63 is removably secured a knife 67, having an inclined cutting edge spaced a little away from the rim 51 and in position to sever the tops from beets which are in the grasp of the fingers 60. Adjacent the knife 67 are the upwardly-projecting arms 68, to which is secured a guide 69, positioned to receive the beet-root after being released by the fingers 60 and with its lower end in position to discharge the beet into the adjustable chute 70.

The chute 70 is mounted in any approved manner to be tilted, as upon the trunnions 71 and 72, and provided with any approved means for tilting the same and holding it at an obtained and desired inclination, as the segment 73, engaging the pinion 74, operated by means of the crank-arm 75 or in any approved and convenient manner.

Upon opposite sides of the lifting-wheel receptacles 76 and 77 are rigidly secured upon the axle 12 and in position to receive roots discharged from the chute 70 and provided with bottoms 78, inclined rearwardly. At their rearward ends the receptacles 76 and 77 are provided, respectively, with end-gates 79 and 80, hinged at their upper edges in any approved manner, as upon the rods 81 and 82, extending transversely of the said receptacles and secured in closed position in any approved manner, as by rods 83 and 84, respectively pivoted thereto and extending forwardly through the inclined bottoms 78 and connected with curved links 85 and 86. The curved links 85 and 86 are respectively pivoted to arms 87 and 88, rigidly carried upon a shaft 89, journaled, as in the alined bearings 90 and 91, upon the frame-pieces 35 and 38 and operated by means of the hand-lever 92.

To raise the lifting-wheel out of operative contact with the ground, links 93 and 94 are pivoted to brackets 95 and 96, rigidly secured upon the frame-pieces 44 and 45, adjacent the bearings 46 and 47 upon opposite sides of the lifting-wheel and extend forwardly to and are connected with curved links 97 and 98, pivotally secured to arms 99 and 100, which are rigidly carried upon a shaft 101, journaled upon the frame-pieces 35 and 38, as by the bearings 102 and 103, and operated by a hand-lever 104. To assist in raising the lifting-wheel upon its pivotal trunnions 42 and 43, springs 105 and 106 are secured with their rearward ends connected to the brackets 95 and 96 and their forward ends connected with eyebolts 107 and 108, extending through upstanding frame-pieces 109 and 110 and adjustable by means of nuts 111 and 112, engaged upon the said eyebolts.

Adjacent the rim 51 and beneath the curved frame-piece 63 is suspended an inclined trough 113 by means of links 114 and 115, pivoted beneath the axle 12 and receiving oscillatory motion from the rod 116, which receives reciprocating motion in any approved manner, as by means of the roller 117, journaled upon the extremity of the said rod and engaged by a cam 118, carried upon the hub of one of the carrying-wheels 13, and the return movement of the said rod accomplished by means of the spring 119, secured to an eye 120, rigid with the axle, and at its other end with a lug 121, rigid with the said rod 116.

In operation draft is applied to the machine in any usual and well-known manner and the machine drawn longitudinally of a row of beets in such manner that the caster-wheel 16 crushes the tops of the said beets as the first operation performed. Following the caster-wheel the spaced plows throw the dirt away from the row of beets upon each side, leaving the beets standing in a narrow comb of soil. Following the plows comes the lifting-wheel, with its gripping-fingers held in extended position, as shown in Fig. 8, by the cams 65 and 66 until the said gripping-fingers are immediately above the beet to be pulled, when the said fingers are released from the cam in the manner above described, and under the tension of the springs 59 the fingers are closed to grip the beet and lift it from the soil, carrying it about its periphery, as shown in Fig. 1, into contact with the knife 67, by which the beet is severed from the foliage, the beet falling upon the guide 69 and the foliage beneath the knife and guide 69 into the inclined trough 113, which receives a reciprocating motion, as described, to discharge the foliage at one side of the lifting-wheel. The severed beet-root is guided by the guide 69 into the chute 70, which is inclined toward either side to discharge the beet into either one of the receptacles 76 or 77. When the receptacle is filled, it may be at once emptied by the movement of the lever 92 to open the end-gates 79 and 80, or the chute 70 may be reversely tilted to fill the opposite receptacle and both such receptacles emptied simultaneously.

The plows 18 and 19 are regulated as to depth of cut and are lifted and held out of operative contact by means of the lever 25, engaged by the segmental rack 27, as shown, the said plows being shown in Fig. 1 as in operative position and in Figs. 3 and 4 as out of operative contact.

When the device is not in operation, the lifting-wheel is lifted from contact with the ground by throwing the lever 104 forwardly until the shaft 101 is within the curvature of the curved link 97, whereupon the strain upon the rod 93 is below the pivoted point and the lever is held from backward movement in the usual well-known manner.

What we claim is—

1. In a machine of the class described, a wheeled vehicle, a pulling-wheel journaled upon the vehicle in the rear of the vehicle-axle, a receptacle carried by the vehicle forwardly of the pulling-axle, gripping members carried by the pulling-wheel, and means for separating the gripping members adjacent the receptacle.

2. In a machine of the class described, a wheeled vehicle, a pulling-wheel journaled upon the vehicle in the rear of the vehicle-axle, a receptacle carried by the vehicle forwardly of the pulling-wheel axle, gripping-fingers carried by and extending transversely from opposite sides of the pulling-wheel, and means for separating the gripping members adjacent the receptacle.

3. In a machine of the class described, a wheeled vehicle, a pulling-wheel journaled upon the vehicle in the rear of the vehicle-axle, a receptacle carried by the vehicle forwardly of the pulling-wheel axle, gripping-fingers curved about the periphery of the pulling-wheel, and means for separating the gripping-fingers adjacent the receptacle.

4. In a machine of the class described, a wheeled vehicle, a pulling-wheel journaled upon the vehicle in the rear of the vehicle-axle, a receptacle carried by the vehicle forwardly of the pulling-wheel axle, gripping-fingers curved about the periphery of the pulling-wheel, resilient means arranged to hold the gripping-fingers in gripping position, and means for separating the gripping-fingers adjacent the receptacle.

5. In a machine of the class described, a wheeled vehicle, a pulling-wheel journaled upon the vehicle in the rear of the vehicle-axle, a receptacle carried by the vehicle forwardly of the pulling-wheel axle, gripping-fingers curved about the edges of the pulling-wheel and extending transversely from opposite sides, resilient means arranged to hold the gripping-fingers in gripping position, and means for separating the gripping-fingers adjacent the receptacle.

6. In a machine of the class described, a wheeled vehicle, a pulling-wheel journaled upon the vehicle in the rear of the vehicle-axle, a receptacle carried by the vehicle forwardly of the pulling-wheel axle, gripping members carried by the pulling-wheel, a knife adjacent the receptacle, means adjacent the knife for discharging into the receptacle, means beneath the vehicle for discharging at one side of the pulling-wheel, and means for separating the gripping-fingers adjacent the knife.

7. In a machine of the class described, a wheeled vehicle, a pulling-wheel journaled upon the vehicle in the rear of the vehicle-axle, a receptacle carried by the vehicle forwardly of the pulling-wheel axle, gripping-fingers curved about the edge of the pulling-wheel and extending transversely from opposite sides, a knife adjacent the receptacle, means adjacent the knife for discharging into the receptacle, means beneath the vehicle for discharging at one side of the pulling-wheel, resilient means arranged to hold the gripping-fingers yieldingly in gripping position, and means for separating the gripping-fingers adjacent the knife.

8. In a machine of the class described, a wheeled vehicle, a pulling-wheel journaled upon the vehicle in the rear of the vehicle-axle, a receptacle carried by the vehicle forwardly of the pulling-wheel axle, gripping-fingers curved about the edges of the pulling-wheel and extending transversely from opposite sides, a knife disposed adjacent the periphery of the pulling-wheel and adjacent the receptacle, a discharge arranged to discharge material from the knife into the receptacle, a discharge beneath the vehicle arranged to discharge material at one side of the pulling-wheel, resilient means arranged to hold the gripping-fingers yieldingly in gripping position, means carried by the frame for separating the gripping-fingers after passing the knife.

9. In a machine of the class described, a wheeled vehicle, a pulling-wheel journaled upon the vehicle, a receptacle carried by the vehicle, means positioned to discharge material from the periphery of the pulling-wheel into the receptacle, means disposed beneath the vehicle arranged to discharge material at one side of the pulling-wheel, and means connected with the vehicle-wheels for shaking the lower discharge.

10. In a machine of the class described, a wheeled vehicle, a pulling-wheel journaled upon the vehicle, means carried by the pulling-wheel for engaging and lifting material from the ground, a receptacle carried by the vehicle, means arranged to discharge material from the periphery of the pulling-wheel into the receptacle, a chute arranged beneath the vehicle and positioned to receive material from the periphery of the pulling-wheel, and means connected with the vehicle-wheels for imparting a shaking movement to the chute.

11. A machine of the class described, comprising a wheeled vehicle, a pulling-wheel journaled upon the vehicle in the rear of the vehicle-axle, a receptacle carried by the vehicle forwardly of the pulling-wheel axle, gripping-fingers curved about the edges of and extending transversely from opposite sides of the pulling-wheel, a knife disposed adjacent the periphery of the pulling-wheel and the receptacle, means disposed adjacent the knife for discharging into the receptacle, resilient means arranged to hold the gripping-fingers yieldingly in gripping position, means carried by the vehicle for separating the fingers after passing the knife, a chute disposed beneath the vehicle and positioned to receive material from the periphery of the pulling-wheel and below the knife, and means connected with the vehicle-wheels for imparting a shaking movement to the chute.

12. In a machine of the class described, a wheeled vehicle, a pulling-wheel journaled upon the vehicle and embodying a broad peripheral band arranged for contact with and rotation by the ground, gripping members carried by the rim, means to hold the gripping members in gripping position, and means for releasing the gripping members.

13. In a machine of the class described, a wheeled vehicle, a pulling-wheel journaled upon the vehicle and embodying a broad peripheral band arranged for contact with and rotation by the ground, gripping-fingers curved about opposite edges of the peripheral band and extending transversely thereof, resilient means arranged to hold the gripping-fingers yieldingly in gripping position, and means carried by the vehicle for separating the gripping-fingers.

14. A machine of the class described, comprising a wheeled vehicle, a pulling-wheel journaled upon the vehicle and rearwardly of the vehicle-axle, and embodying a broad peripheral band arranged for contact with and rotation by the ground, a receptacle carried by the vehicle forwardly of the pulling-wheel axle, fingers curved about the edges of the peripheral band and extending transversely thereof, resilient means arranged to hold the gripping-fingers in gripping position, and means carried by the vehicle for separating the gripping-fingers adjacent the receptacle.

15. A machine of the class described, comprising a wheeled vehicle, a pulling-wheel journaled upon the vehicle rearwardly of the vehicle-axle and embodying a broad peripheral band arranged for contact with and rotation by the ground, gripping-fingers curved about the edges of the peripheral band, resilient means arranged to hold the fingers yieldingly in gripping position, a receptacle carried by the vehicle forwardly of the pulling-wheel axle, a knife carried by the vehicle adjacent the receptacle, means arranged to discharge material from the knife into the receptacle, and means carried by the vehicle for separating the gripping-fingers adjacent the knife.

16. A machine of the class described, comprising a wheeled vehicle, a pulling-wheel journaled upon the vehicle rearwardly of the vehicle-axle and embodying a broad peripheral band arranged for contact with and rotation by the ground, a receptacle carried by the vehicle forwardly of the gripping-wheel axle, a knife adjacent the receptacle and the periphery of the pulling-wheel, means arranged to discharge material from the knife to the receptacle, gripping-fingers curved about the edges of the peripheral band of the pulling-wheel and extending transversely thereof, resilient means arranged to hold the gripping-fingers yieldingly in gripping position, means carried by the vehicle for separating the gripping-fingers adjacent the knife, a chute disposed beneath the vehicle adjacent to and in position to receive material from the periphery of the pulling-wheel, and means connected with the vehicle-wheels arranged to impart a shaking movement to the chute.

In testimony whereof we have affixed our signatures in presence of two subscribing witnesses.

JOHN LYMAN WEBB.
MARCELLUS HORACE WEBB.

Witnesses:
  ALBERT R. NICHOLS,
  NELSON J. BEAUREGARD.